(12) United States Patent
Park et al.

(10) Patent No.: US 11,977,704 B2
(45) Date of Patent: May 7, 2024

(54) TOUCH DRIVING DEVICE FOR DRIVING A TOUCH PANEL INCLUDING AREAS HAVING DIFFERENT TOUCH SENSITIVITIES

(71) Applicant: LX Semicon Co., Ltd., Daejeon (KR)

(72) Inventors: Se Jeong Park, Daejeon (KR); Yeong Il Jeon, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/954,972

(22) Filed: Sep. 28, 2022

(65) Prior Publication Data

US 2023/0099960 A1 Mar. 30, 2023

(30) Foreign Application Priority Data

Sep. 30, 2021 (KR) .......... 10-2021-0129638

(51) Int. Cl.
| | |
|---|---|
| *G06F 3/041* | (2006.01) |
| *B60K 35/00* | (2006.01) |
| *G06F 3/044* | (2006.01) |
| *G06F 3/04886* | (2022.01) |

(52) U.S. Cl.
CPC ........ *G06F 3/041661* (2019.05); *B60K 35/00* (2013.01); *G06F 3/0418* (2013.01); *G06F 3/044* (2013.01); *B60K 2370/1434* (2019.05); *B60K 2370/152* (2019.05); *B60K 2370/166* (2019.05); *G06F 3/04886* (2013.01)

(58) Field of Classification Search
CPC .... G06F 3/0412; G06F 3/0446; G06F 3/0486; G06F 3/0418; G06F 3/044; G06F 3/041661; G06F 3/04886; B60K 35/00; B60K 2370/1434; B60K 2370/152; B60K 2370/166; B60K 2370/1468; B60K 2370/1438
See application file for complete search history.

(56) References Cited

U.S. PATENT DOCUMENTS

2003/0206162 A1* 11/2003 Roberts ............... G06F 3/04142
345/173
2012/0098760 A1* 4/2012 Chuang ................ G06F 3/0418
345/173

FOREIGN PATENT DOCUMENTS

| KR | 20130086422 A | 8/2013 |
|---|---|---|
| KR | 102213714 B1 | 2/2021 |

* cited by examiner

*Primary Examiner* — Yaron Cohen
(74) *Attorney, Agent, or Firm* — ROTHWELL, FIGG, ERNST & MANBECK, P.C.

(57) ABSTRACT

The present disclosure relates to a touch driving device, a display device including the same, and a touch management device, and more particularly, to a touch driving device which includes a panel divided into one or more separate areas and differently sets the touch sensitivities for the respective areas in order to prevent an error caused by a user's mistake, and a display device including the same and a touch management method.

15 Claims, 13 Drawing Sheets

Touch

Non Touch

TOUCH DRIVING DEVICE FOR DRIVING A TOUCH PANEL INCLUDING AREAS HAVING DIFFERENT TOUCH SENSITIVITIES

CROSS REFERENCE TO RELATED APPLICATION

This application claims priority to Republic of Korea Patent Application No. 10-2021-0129638, filed on Sep. 30, 2021, which is hereby incorporated by reference in its entirety.

BACKGROUND

1. Field of Technology

The present disclosure relates to a touch driving device, a display device including the same, and a touch management device.

2. Related Technology

In general, a touch screen refers to a screen which is designed to recognize a portion touched by a finger or ballpoint pen-shaped touch pen, and execute a command or move the location of a cursor. When a touch occurred, the touch is recognized only in case that the touch satisfies a condition on whether the touch has a higher sensitivity than a predetermined touch sensitivity, and has lasted during a predetermined frame or more.

In the conventional touch screen, a touch area and a display area are the same area, and the same touch recognition condition is applied to the entire area. Therefore, when a user touches the touch screen by mistake, an unwanted operation may be performed.

The discussions in this section is only to provide background information and does not constitute an admission of prior art.

SUMMARY

Under such a background, in one aspect, various embodiments are directed to providing a technology capable of dividing a touch panel into a plurality of areas, and separately setting the touch sensitivities of the respective areas.

In one aspect, an embodiment may provide a touch driving device including: a touch driving circuit configured to supply a drive signal to a sensor electrode of a touch panel, to receive a reaction signal of the sensor electrode to the drive signal, and to generate a sensing value; and a micro controller configured to set a first touch sensitivity in a first area of the touch panel, to set a second touch sensitivity in a second area of the touch panel, and to determine whether a sensing value from the first area is equal to or more than the first touch sensitivity and if a sensing value from the second area is equal to or more than the second touch sensitivity, wherein the first area and the second area have different touch sensitivities.

When the reaction signal is generated by a continuous touch passing through the second area from the first area, the micro controller may generate a touch release event at the boundary between the first and second areas.

The micro controller may receive a setting value from a host, sets a first touch sensitivity for the first area, and set a second touch sensitivity for the second area, the second touch sensitivity being different from the first touch sensitivity.

The micro controller may receive, from the host, information on a start x coordinate, a start y coordinate, an end x coordinate and an end y coordinate, and decide the location of the first or second area.

The micro controller may set the threshold value of change in capacitance of the sensor electrode, and recognize a touch by using a sensing value corresponding to a capacitance change equal to or more than the threshold value.

The micro controller may receive different threshold values of change in capacitance for the first and second areas from the host.

The micro controller may set the threshold value of a bounce number, and recognize a touch by using a sensing value equal to or more than the threshold value, wherein bouncing indicates that touch inputs are momentarily repeated.

The micro controller may receive different threshold values of the bounce number for the first and second areas from the host.

The micro controller may include an infinite impulse response (IIR) filter, and recognize a touch on the basis of a result value derived by calculating the sensing value through the IIR filter.

The micro controller may receive different filter coefficients of the IIR filter for the first and second areas from the host.

In another aspect, an embodiment may provide a touch driving device including: an area setting circuit configured to set a first area and a second area on a touch panel; a touch sensitivity setting circuit configured to set a first touch sensitivity for the first area and set a second touch sensitivity for the second area; and a touch recognition circuit configured to recognize only a touch having a touch sensitivity equal to or more than each touch sensitivity by determining whether a first touch inputted in the first area is equal to or more than the first touch sensitivity and/or if a second touch inputted in the second area is equal to or more than the second touch sensitivity.

When the user's touch is a continuous touch passing through the second area from the first area, the touch recognition circuit may recognize only a touch in the first area.

The area setting circuit may adjust the locations and sizes of the first and second areas according to a user's selection.

The touch sensitivity setting circuit may change the touch sensitivities of the first and second areas according to a user's selection.

In still another aspect, an embodiment may provide a display device including: a touch panel configured to receive a user's touch; a touch driving device configured to set a first area and a second area in the touch panel, set a first touch sensitivity for the first area, and set a second touch sensitivity for the second area, the second touch sensitivity being different from the first touch sensitivity; and a display panel configured to output different applications onto the first and second areas, respectively.

The display panel may output applications executed by a host respectively to the first and second areas.

An application for controlling gear shift of a vehicle may be outputted onto the first area, and a navigation application may be outputted onto the second area.

According to the present embodiments, the touch panel may be divided into a plurality of areas and the touch sensitivities of the respective areas may be separately set and managed.

DETAILED DESCRIPTION OF EMBODIMENTS

Figure 1:
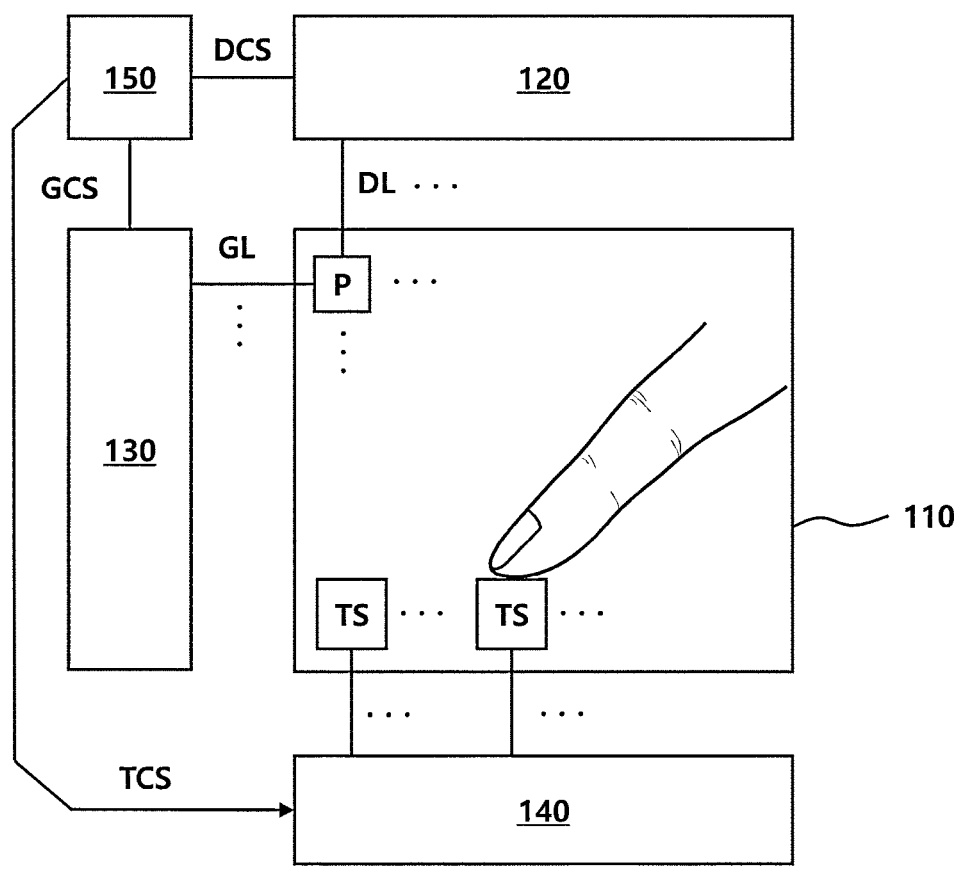
FIG. 1 is a configuration diagram of a display device in accordance with an embodiment.

FIG. 1 is a configuration diagram of a display device in accordance with an embodiment.

Referring to FIG. 1, a display device 100 may include a panel 110, a data driving device 120, a gate driving device 130, a touch driving device 140, a data processing device 150 and the like.

At least one of the data driving device 120, the gate driving device 130, the touch driving device 140 and the data processing device 150 may be referred to as a display driving device. For example, the data driving device 120 may be referred to as a display driving device, and a driving device including the data driving device 120 and the touch driving device 140 may be referred to as a display driving device. One driving device may be included in another driving device. For example, the data driving device 120 may be included in the touch driving device 140. Alternatively, the gate driving device 130 may be included in the data driving device 120. In an embodiment, only some components of one driving device may be included in another driving device.

The data driving device 120 may drive a data line DL connected to a pixel P, and the gate driving device 130 may drive a gate line GL connected to the pixel P. The touch driving device 140 may drive touch sensors TS arranged on the panel 110.

The data driving device 120 may supply a data voltage to the data line DL in order to display an image on each of the pixels P of the panel 110. The data driving device 120 may include one or more data driving ICs, and the one or more data driving ICs may be connected to a bonding pad of the panel 110 through a tape automated bonding (TAB) method or chip-on-glass (COG) method, or directly formed in the panel 110. In some cases, the one or more data driving ICs may be integrated and formed in the panel 110. The data driving device 120 may be implemented through a chip-on-film (COF) method.

The data driving device 120 may receive image data and a data control signal DCS from the data processing device 150. The data driving device 120 may generate a data voltage according to the grayscale value of each pixel, indicated by the image data, and drive the corresponding pixel.

The gate driving device 130 may supply a scan signal to the gate line GL in order to turn on/off a transistor located in each of the pixels P. Depending on a driving method, the gate driving device 130 may be located only on one side of the panel 110 as illustrated in FIG. 1. Alternatively, the gate driving device 130 may be divided into two parts and located on both sides of the panel 110. Furthermore, the gate driving device 130 may include one or more gate driving ICs, and the one or more gate driving ICs may be connected to a bonding pad of the panel 110 through the TAB or COG method, or implemented in a gate-in-panel (GIP) type and directly formed in the panel 110. In some cases, the one or more gate driving ICs may be integrated and formed in the panel 110. The gate driving device 130 may also be implemented through the COF method.

The gate driving device 130 may receive a gate control signal GCS from the data processing device 150. The gate control signal GCS may include a plurality of clock signals. The gate driving device 130 may generate the scan signal by using a clock signal, and supply the scan signal to the gate line GL.

The panel 110 may include a display panel, and further include a touch screen panel (TSP) 111. The display panel and the touch panel 111 may share some components. For example, a touch sensor TS for sensing a touch on the touch panel may be used as a common electrode in the display panel, to which a common voltage is supplied, when the display panel is a liquid crystal display (LCD) panel. For another example, the touch sensor TS may be used as a cathode electrode in the display panel, to which a ground voltage is supplied, when the display panel is an organic light emitting diode (OLED) panel. Since some components of the display panel and the touch panel 111 are shared, the panel 110 is referred to as an integrated panel. However, the present disclosure is not limited thereto. As a panel in which the display panel and the touch panel 111 are coupled as one body, an in-cell type panel is known. However, this is only an example of the above-described panel 110, and a panel to which the present disclosure is applied is not limited to the in-cell type panel.

The panel 110 may include a plurality of touch sensors TS arranged therein, and the touch driving device 140 may drive the touch sensors TS by using a touch drive signal. Furthermore, the touch driving device 140 may generate a sensing value for a touch sensor TS according to a reaction signal formed in the touch sensor TS in response to the touch drive signal. Furthermore, the touch driving device 140 may calculate the touch coordinate of an object by using sensing values for the plurality of touch sensors TS arranged in the panel 110, and the calculated touch coordinate may be transmitted to another device, e.g. a host, and utilized by the device.

The touch driving device 140 may exchange signals with the object through the touch sensor TS. The touch driving device 140 may receive a touch control signal TCS from the data processing device 150. The touch control signal TCS may include one or more synchronization signals. For example, the touch control signal TCS may include a vertical synchronization signal, a time division signal, a touch synchronization signal and the like. The touch driving device 140 may distinguish between a display period and a touch period according to the time division signal or the touch synchronization signal, and drive the touch sensor TS within the touch period.

The synchronization signals may be the same signals or different signals depending on embodiments. For example, the time division signal may be the same or different signal as or from the touch synchronization signal. In the following descriptions, specific names may be used to describe components in order to emphasize specific functions of the components. However, the descriptions are not limited to the specific names.

The data processing device 150 may control timings of the driving devices 120, 130 and 140 through the control signals GCS, DCS and TCS. In this aspect, the data processing device 150 may be referred to as a timing controller.

Figure 2:
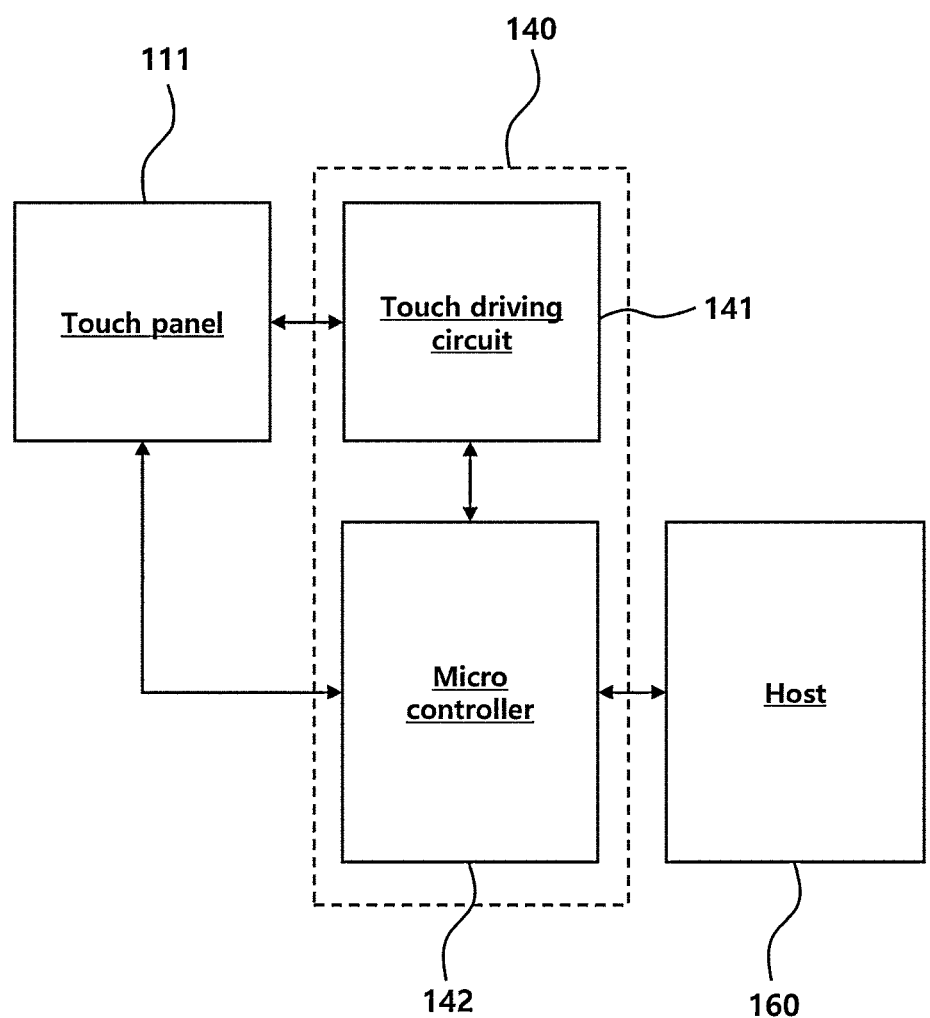
FIG. 2 is a diagram for describing a touch driving device in accordance with an embodiment.

FIG. 2 is a diagram for describing a touch driving device in accordance with an embodiment.

The touch driving device 140 in accordance with the present embodiment may include a touch driving circuit 141 and a micro controller 142.

The touch driving circuit 141 may supply a drive signal to a sensor electrode of the touch panel 111 installed in the display device 100, receive a reaction signal of the sensor electrode to the drive signal, and generate a sensing value for the touch panel 111, i.e. raw data Rawdata for the display device 100.

When there is an object approaching or coming in contact with one location of the touch panel 111, the touch driving circuit 141 may receive a reaction signal having a large magnitude from the sensor electrode disposed at the one location of the touch panel 111. Through this operation, the touch driving circuit 141 may generate a sensing value for the approach to or the contact with the one location of the touch panel 111.

Such a touch panel 111 may include sensor electrodes composed of driving electrodes and receiving electrodes.

The micro controller 142 may calculate and generate touch sensing data on the touch panel by using the sensing value generated through the touch driving circuit 141. The touch sensing data may indicate touch data for the display device 100, which is touch data on the display device 100. The touch sensing data may include a touch coordinate for the display device 100.

The micro controller 142 may set one or more separate areas in the touch panel 111. Furthermore, the micro controller 142 may set touch sensitivity differently for the one or more separate areas.

Here, a touch sensitivity may mean a reference value for the touch driving device's determining whether any touch is inputted. The touch sensitivity may include a threshold value of a change in capacitance by a sensor electrode according to an embodiment and it may include a threshold value of the number of bounces according to another embodiment, wherein the bounce means a phenomenon of repetition of touch inputs, which can occur upon a user's touch input.

In other words, a user's touch input equal to or more than a touch sensitivity may mean a touch input causing a change in capacitance more than a predetermined threshold value of a change in capacitance or a touch input having the number of bounces more than a predetermined threshold value of the number of bounces.

Specifically, the touch driving circuit 141 may generate a sensing value indicating raw data by a user's touch on the touch panel 111. The micro controller 142 may receive the sensing value generated by the touch driving circuit 141, and generate the touch sensing data. The micro controller 142 may set the touch sensitivity to such an extent that the touch sensing data is generated only when the received sensing value exceeds a preset threshold value.

In other words, although a user touches the touch panel 111 such that a sensing value is generated by the touch driving circuit 141, no touch sensing data may be generated in case that the threshold value of the touch sensitivity for the area of the touch panel 111, touched by the user, is set to a larger value than the generated sensing value.

The micro controller 142 may set the threshold value of change in capacitance on the touch panel 111, generated by a user's touch, for each of the one or more separate areas, and set the touch sensitivity to such an extent that no touch sensing data is generated when a sensing value generated by the touch driving circuit 141 does not exceed the threshold value of change in capacitance, set by the micro controller 142.

Specifically, when the change in capacitance on the touch panel 111 does not exceed the threshold value of change in capacitance, set by the micro controller 142, for example, when a user's object did not approach the touch panel 111 enough to change the capacitance on the touch panel 111, a user's touch was conducted for a very short time, or a user's touch area is not wide enough to change the capacitance, no sensing data is generated even though the sensing value was generated by the touch driving circuit 141.

In this case, the micro controller 142 may receive the threshold value of change in capacitance from a host 160, and the user may adjust the threshold value of change in capacitance such that the threshold value of change in capacitance may be set for one or more separate areas formed on the touch panel 111 according to the user's selection.

Furthermore, the micro controller 142 may set the threshold value of the number of bounces which are caused on the touch panel 111 by a user's touch, i.e. the threshold value of a bounce number, and generate touch sensing data by using a sensing value corresponding to the threshold value of the bounce number.

Bouncing refers to a phenomenon in which touch on/off is momentarily repeated when a user touches the touch panel. In reality, although a user touched the touch panel once, such bouncing may cause the same effect as the touch panel was touched several times. In this case, an unwanted operation may be performed several times, thereby causing an error. Therefore, in order to reduce a touch error caused by a user, the micro controller 142 may ignore sensing values which are generated by touch on/off repetitions which momentarily occur, and generate touch sensing data by using a sensing value which is generated after a predetermined number of on/off repetitions. Such a process of removing noise which is generated by bouncing may be referred to as debounce. Furthermore, the threshold value of the touch bounce number may be referred to a touch debounce number TouchDebCnt.

In this case, the micro controller 142 may receive the threshold value of the bounce number from the host 160, and the user may adjust the threshold value of the bounce number such that the threshold value of the bounce number may be set for one or more separate areas formed on the touch panel 111 according to the user's selection.

The micro controller 142 may include an infinite impulse response (IIR) filter, and generate touch sensing data by using a result value which is derived by calculating the sensing value, generated by the touch driving circuit 141, through the IIR filter. The IIR filter is a kind of digital filter, and refers to a filter that performs filtering by recursively applying the value of an output signal as the value of an input signal.

An equation calculated through the IIR filter is expressed as in Equation 1 below.

$$\text{newRawdata} = C \times \text{currentRawdata} + (1-C) \times \text{previousRawdata} \quad \text{[Equation 1]}$$

Referring to Equation 1, the IIR filter generates new raw data newRawdata by using current raw data currentRawdata and previous raw data previousRawdata. In Equation 1, C represents the coefficient of the IIR filter, and may have a value of 0 to 1. The micro controller 142 may receive the coefficient C of the IIR filter from the host 160, and a user may adjust the filtering performance of the IIR filter according to the user's selection by adjusting the coefficient C of the IIR filter.

TABLE 1

| current raw data | previous raw data | reference | coefficient | new raw data | difference |
|---|---|---|---|---|---|
| 2100 | 2000 | 2000 | 1.00 | 2100 | 100 |
| 2100 | 2000 | 2000 | 0.90 | 2090 | 90 |
| 2100 | 2000 | 2000 | 0.80 | 2080 | 80 |
| 2100 | 2000 | 2000 | 0.70 | 2070 | 70 |
| 2100 | 2000 | 2000 | 0.60 | 2060 | 60 |

Table 1 is a table for describing the effect of the IIR filter by using example values. Referring to Table 1, the IIR filter may receive current raw data and previous raw data, and generate new raw data through the current raw data and the previous raw data. When the received current raw data is larger than the received previous raw data, the new raw data calculated by the IIR filter is derived as a smaller value than the current raw data. Specifically, Table 1 shows that, although the current raw data is 2100, the new raw data which are derived through the filtering process using the previous raw data tend to decrease according to the coefficient value of the IIR filter.

From the viewpoint from a sensing value generated by a user's touch in the touch panel 111, the user may input a touch to the touch panel 111 such that the touch driving circuit 141 generates a sensing value. While the user is inputting a touch, a sensing value generated by the touch driving circuit 141 may be gradually increasing. In Table 1, the current raw data corresponds to a larger value than the previous raw data. In this case, when the sensing value generated by the touch driving circuit 141 is filtered by an IIR filter having a coefficient C of less than 1, the sensing value calculated by the IIR filter may be derived as a smaller value than the current input sensing value. Therefore, although the user touches the touch panel 111 by mistake, a sensing value derived by the IIR filter will have a smaller value than a sensing value which is not filtered. Thus, the sensing value may be smaller than the threshold value of the touch sensitivity set by the micro controller 142, which makes it possible to prevent an error caused by mistake.

When setting one or more separate areas, the micro controller 142 may receive area coordinate information from the host 160, and set the one or more separate areas. The sizes and locations of the one or more separate areas set on the touch panel may be set variously according to the area coordinate information transmitted from the host.

In accordance with an embodiment, a user may input a data value for an area to the host 160, and the host 160 may change the data value for the area into area coordinate information and transmit the area coordinate information to the micro controller 142. The area coordinate information may include information on a start x coordinate, a start y coordinate, an end x coordinate and an end y coordinate, and the micro controller 142 may set one or more separate areas on the touch panel 111 by using the corresponding information. The one or more separate areas set on the touch panel 111 may be each a rectangular area having a diagonal line set to a line segment which connects a first point having the start x coordinate and the start y coordinate and a second point having the end x coordinate and the end y coordinate. Furthermore, the user may input new data values for the areas, thereby adjusting the number, sizes and locations of the separate areas formed on the touch panel 111.

The host 160 may be a main control circuit of an electronic device. For example, when the electronic device is a mobile communication terminal, the host may be an application processor of the mobile communication terminal. Furthermore, when the electronic device is a monitor or TV, the host may be a multi-core processor of the monitor or TV.

Figure 3:
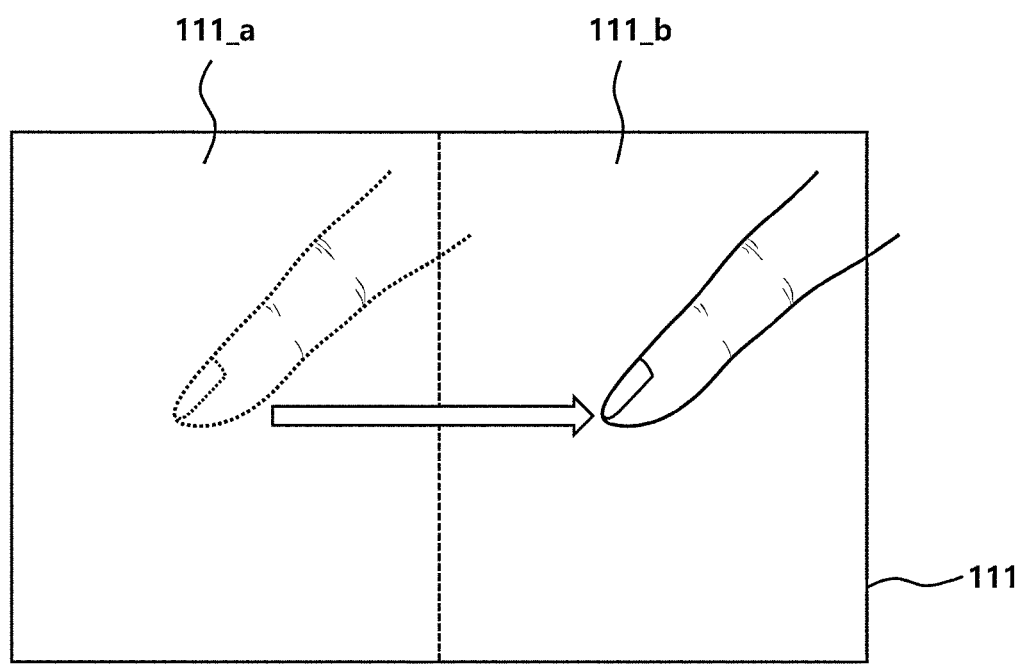
FIG. 3 is a diagram for describing the relationship between separate areas formed on a touch panel

FIG. 3 is a diagram for describing the relationship between separate areas formed on a touch panel.

Referring to FIG. 3, the micro controller 142 may set one or more separate areas on the touch panel 111. Furthermore, touch sensitivity may be differently set for the one or more separate areas. Furthermore, the display panel may distinguish the one or more separate areas set on the touch panel 111, such that different applications are outputted to the respective areas. The one or more separate areas displayed on the panel 110 may correspond to one or more separate areas set on the touch panel 111 by the touch driving device 140, and correspond to one or more separate areas displayed on the display panel.

In accordance with an aspect of the present embodiment, the touch panel 111 may be divided into a first area 111_a and a second area 111_b, which have different touch sensitivities. The micro controller 142 may adjust touch sensitivities of the first and second areas 111_a and 111_b by setting the threshold value of change in capacitance, the threshold value of the bounce number, information on whether filtering has been performed by the IIR filter, and the coefficient of the IIR filter. The first and second areas 111_a and 111_b set in the touch panel 111 may be distinguished by the display panel such that different applications are outputted to the respective areas, and the first and second areas 111_a and 111_b may correspond to areas displayed on the panel 110 by the display panel.

Since the first and second areas 111_a and 111_b are divided and set in the touch panel 111, a continuous touch (drag) may be conducted across the first and second areas 111_a and 111_b by a user. In this case, the micro controller 142 may generate a touch release event when the continuous touch crosses the boundary between the first and second areas 111_a and 111_b. Therefore, although a continuous touch (drag) was conducted through to the second area 111_b from the first area 111_a by the user, no touch sensing data is generated in the second area 111_b, which makes it possible to acquire the same result as no touch occurred. The same result may be acquired even when a continuous touch (drag) is conducted through the first area 111_a from the second area 111_b by the user.

The micro controller 142 may generate the touch release event when the continuous touch crosses the boundary between the one or more separate areas formed on the touch panel 111, thereby preventing an error which may be caused when the user touches the touch panel 111 by mistake. Specifically, when the user touched the touch panel 111 with an intention to input a touch to the first area 111_a but accidently conducted a continuous touch (drag) from the first area 111_a to the second area 111_b, the micro controller 142 may consider that the touch on the second area 111_b was not inputted, thereby making it possible to expect an effect of reducing an error of the user.

Figure 4:
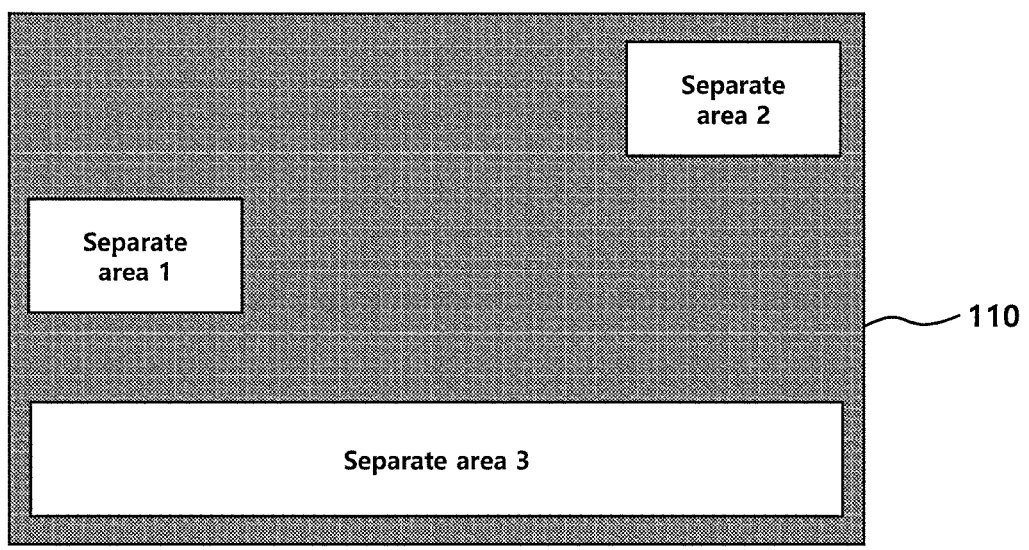
FIG. 4 is a graph for describing the separate areas formed on the touch panel.

FIG. 4 is a graph for describing the separate areas formed on the touch panel.

Referring to FIG. 4, the micro controller 142 may set one or more separate areas on the touch panel 111. For example, three or more separate areas may be set as illustrated in FIG. 4. Furthermore, the display panel may distinguish the one or more separate areas set on the touch panel 111, such that different applications are outputted to the respective areas. The micro controller 142 may adjust the touch sensitivity of each of the one or more separate areas by setting the threshold value of change in capacitance, the threshold value of the bounce number, the information on whether filtering has been performed by the IIR filter, and the coefficient of the IIR filter. The micro controller 142 may generate the touch release event when a continuous touch crosses the boundary between the respective separate areas.

The user may input a data value for setting an area to the host 160, and the host 160 may change the data value for setting the area into area coordinate information, and transmit the area coordinate information to the micro controller 142. The area coordinate information may include information on a start x coordinate, a start y coordinate, an end x coordinate and an end y coordinate, and the micro controller 142 may set one or more separate areas on the touch panel 111 by using the corresponding information. The one or more separate areas set on the touch panel 111 may be each a rectangular area having a diagonal line set to a line segment which connects a first point having the start x coordinate and the start y coordinate to a second point having the end x coordinate and the end y coordinate. Furthermore, the user may input new data values for the areas, thereby adjusting the number, sizes and locations of the separate areas formed on the touch panel 111.

The one or more separate areas may output applications executed by the host 160, respectively, and the applications executed by the host 160 may include various applications such as an application for controlling the gear shift of a vehicle, a navigation application, TV, radio, video player, music player and map.

Figure 5:
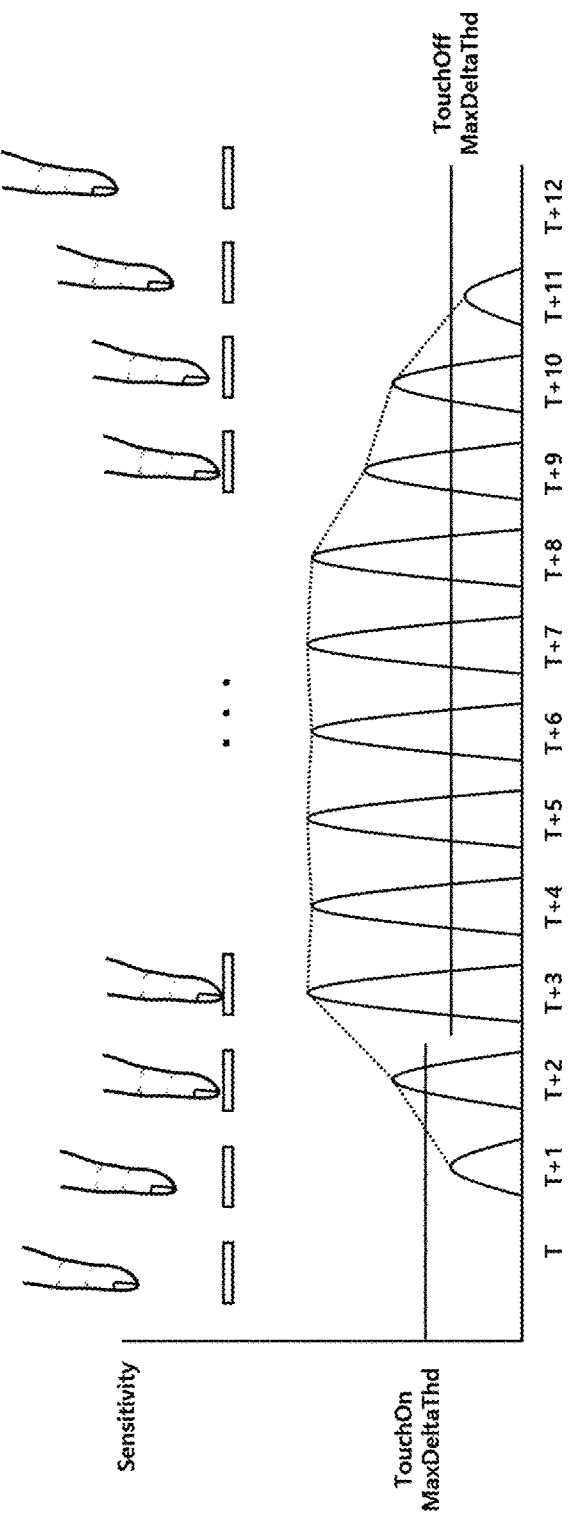
FIG. 5 is a diagram for describing an embodiment regarding a setting of threshold values of a touch-on and a touch-off.

FIG. 5 is a diagram for describing an embodiment regarding a setting of threshold values of a touch-on and a touch-off.

Referring to FIG. 5, when a touch is inputted into the touch panel as shown in FIG. 5, signals are generated. The signals become intense with time. Since only a case when signals exceed the touch-on threshold value are considered as a case when a touch is inputted, when the intensity of a signal of the touch input exceeds a touch-on threshold value, a subsequent step such as a calculation of touch coordinates may be performed. Here, T means an arbitrary time. Lapses of time are represented as T+1 to T+12. Each of T to T+12 is one frame.

When a finger or a touch pen is away from the touch panel and a touch is stopped, signals for the touch may become weak as shown in FIG. 5. When the signal is lower than a touch-off threshold value, it is considered that the touch input is stopped and the subsequent step such as a calculation of touch coordinates may not be performed.

Figure 6:
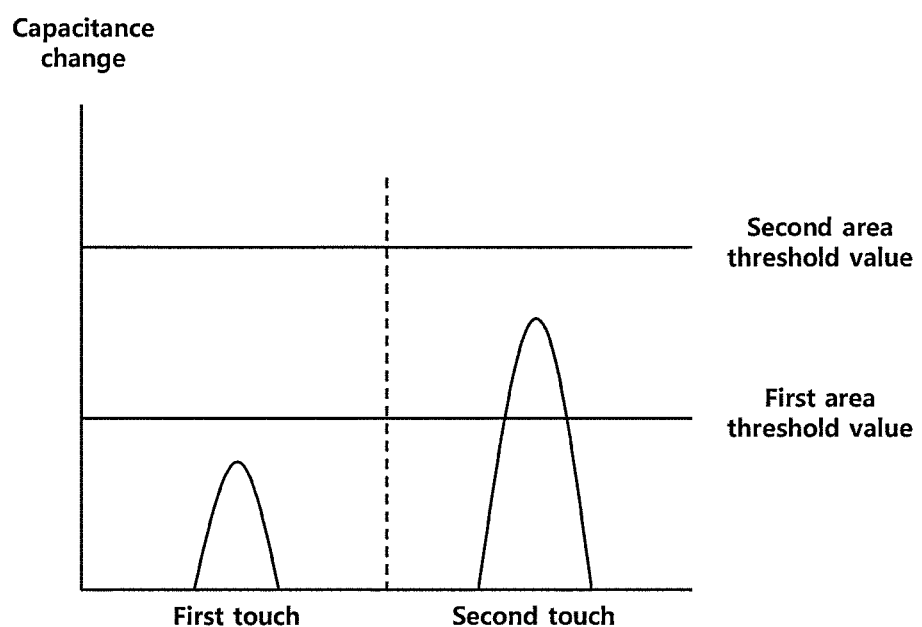
FIG. 6 is a graph for describing a process of setting touch sensitivities by setting threshold values of changes in capacitance.

FIG. 6 is a graph for describing a process of setting touch sensitivities by setting threshold values of changes in capacitance.

A capacitive touch screen is a kind of touch screen, and has a transparent electrode formed by applying a specific conductive metal onto either side of a substrate constituting a touch screen sensor. The capacitive touch screen operates according to the following principle. When a predetermined amount of current is passed across the surface of the panel, an electric field existing between two electrodes is changed by a user's touch, which affects the amount of charge stored in each of the electrodes. The capacitive touch screen recognizes a portion touched by the user through the change in amount of charge, and calculates the magnitude of the touch, thereby detecting the location of the touch. That is, when the user touches the touch panel 111 with a finger or touch pen, the capacitance of the touch panel 111 is changed, and the capacitive touch screen recognizes the change in capacitance, and decides whether the touch occurred and the location of the touch.

In accordance with an aspect of the present embodiment, the first area 111_a having a relatively low threshold value of change in capacitance and the second area 111_b having a relatively high threshold value of change in capacitance are set in the touch panel 111 by the micro controller 142, as illustrated in FIG. 6. When a first touch corresponding to a smaller change in capacitance than the threshold value of the first area 111_a and the threshold value of the second area 111_b is conducted on the first area 111_a and the second area 111_b, the micro controller 142 may generate no touch sensing data on the basis of sensing values generated by the respective areas.

However, when a second touch corresponding to a larger change in capacitance than the threshold value of the first area 111_a and a smaller change in capacitance than the threshold value of the second area 111_b is conducted on the first area 111_a and the second area 111_b, the micro controller 142 may generate touch sensing data on the basis of a sensing value generated in the first area 111_a, but generate no touch sensing data on the basis of a sensing value generated in the second area 111_b. The touch sensitivity of the touch panel 111 may be set according to whether the touch sensing data is generated by the change in capacitance.

FIGS. 7A to 7D are graphs for describing a process of setting touch sensitivities by setting the threshold values of bounce numbers.

Bouncing refers to a phenomenon that a temporary touch of a user's finger or touch pen on the touch panel 111 and a separation of the user's finger or touch pen from the touch panel 111 are repeated, when the user's finger or the touch pen touches the touch panel 111 or separates from the touch panel 111. That is, bouncing indicates that, although the user touched the touch panel 111 once, several touches are momentarily inputted. Bouncing may also be referred to as chattering.

In accordance with an aspect of the present embodiment, a first area 111_a having a relatively low bounce number threshold value and a second area 111_b having a relatively high bounce number threshold value may be set in the touch panel 111 by the micro controller 142, as illustrated in FIGS. 7A to 7D.

Figure 7A:
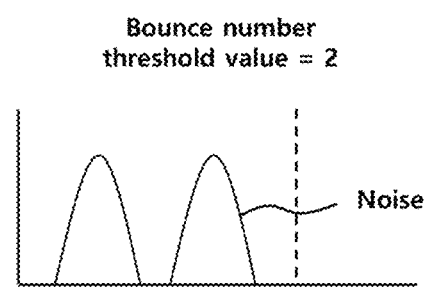
FIGS. 7A to 7D are graphs for describing a process of setting touch sensitivities by setting the threshold values of bounce numbers.
Figure 7B:
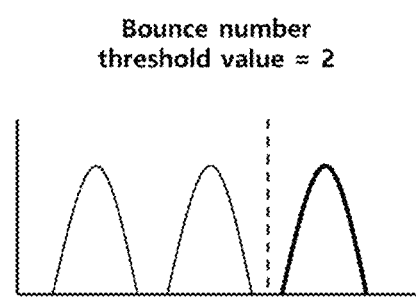
Figure 7C:
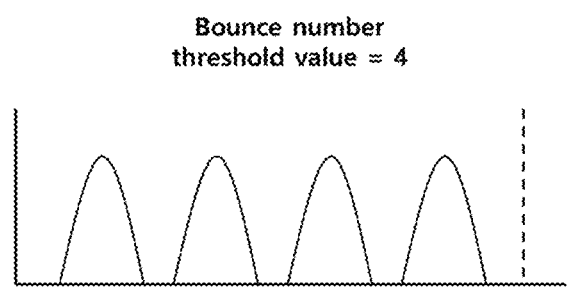
Figure 7D:
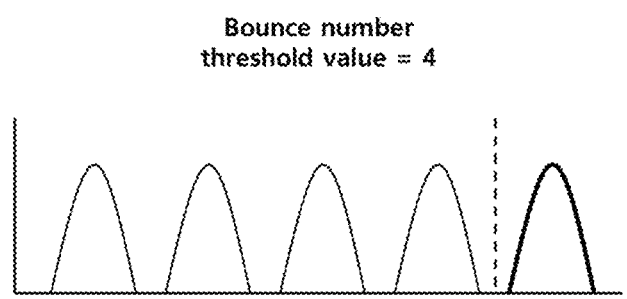

For example, as illustrated in FIGS. 7A to 7D, it may be assumed that the bounce number threshold value for the first area 111_a is set to 2, and the bounce number threshold value for the second area 111_b is set to 4. In this case, although the user touched the first area 111_a such that two touch bounces occurred as illustrated in FIG. 7A, no touch sensing data may be generated on the basis of noise generated by the bounces. However, when the bounce number threshold value was set to 2, but three touch bounces were caused by the user's touch on the touch panel 111 as illustrated in FIG. 7B, the micro controller 142 may recognize, as a touch, noise generated for the third time or noise generated after the third touch bounce, and generate touch sensing data. Although the user touched the second area 111_b having the touch bounce threshold value set to 4 as in FIG. 7C such that four touch bounces occurred, no touch sensing data may be generated on the basis of noise generated by the bounces. However, when the bounce number threshold value was set to 4 but five touch bounces were caused by the user's touch on the touch panel 111 as illustrated in FIG. 7D, the micro controller 142 may recognize, as a touch, noise generated for the fifth time or noise generated after the fifth touch bounce, and generate touch sensing data.

As such, the micro controller 142 may adjust a variable for bouncing which may be caused by a user's touch on the touch panel 111, such that only a touch desired by the user can be inputted, and prevent a possible touch error. Such a process of removing noise which is generated by bouncing may be referred to as debounce. Furthermore, the threshold value of the touch bounce number may be referred to as a touch debounce number TouchDebCnt.

Figure 8A:
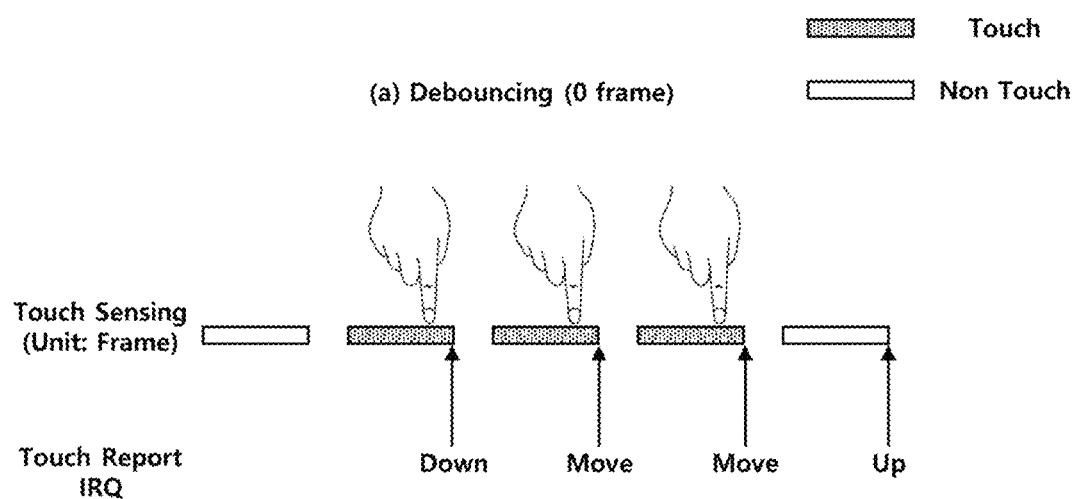
FIGS. 8A and 8B are diagrams for specifically describing an embodiment of a touch sensing operation when a bounce number threshold value is set and touches are inputted.
Figure 8B:
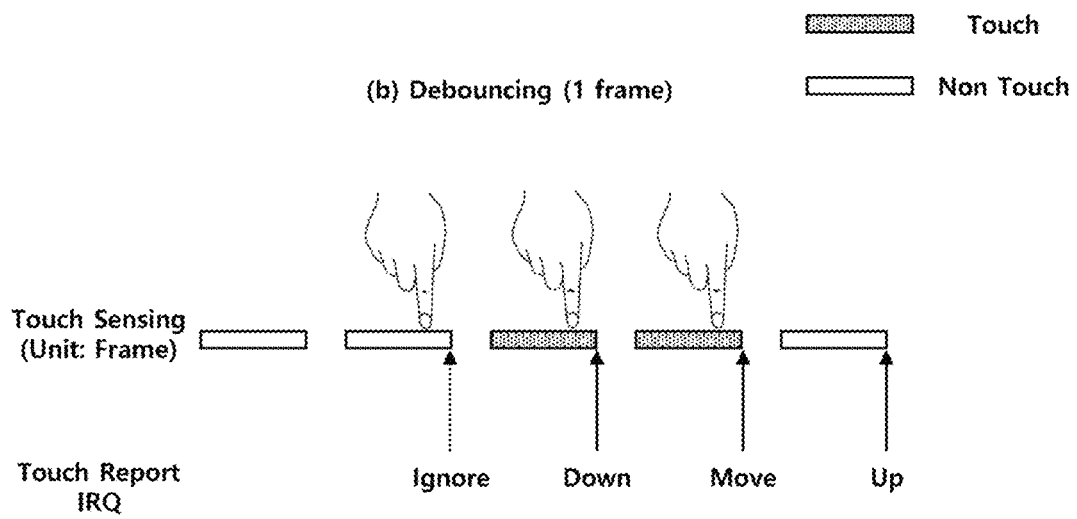

FIGS. 8A and 8B are diagrams for specifically describing an embodiment of a touch sensing operation when a bounce number threshold value is set and touches are inputted.

Referring to FIGS. 8A and 8B, a threshold value of the number of bounces may be set by frame.

As shown in FIG. 8A, in a case when the threshold value of the number of bounces is not set, touches in 3 frames may be identified to be inputted and respectively recognized as a down operation, a move operation, and an up operation and an interruption request (IRQ) including the relevant information may be transmitted to a processing device, such as a processor.

However, as shown in FIG. 8B, in a case when the threshold value of the number of bounces is set as 1 frame, even if there are touches in 3 frames, the touch in the first frame may not be considered to be inputted. The touches from the second frame are considered to be inputted and recognized as a down operation, a move operation and an up operation and an IRQ including the relevant information may be transmitted to a processing device, such as a processor.

Figure 9A:
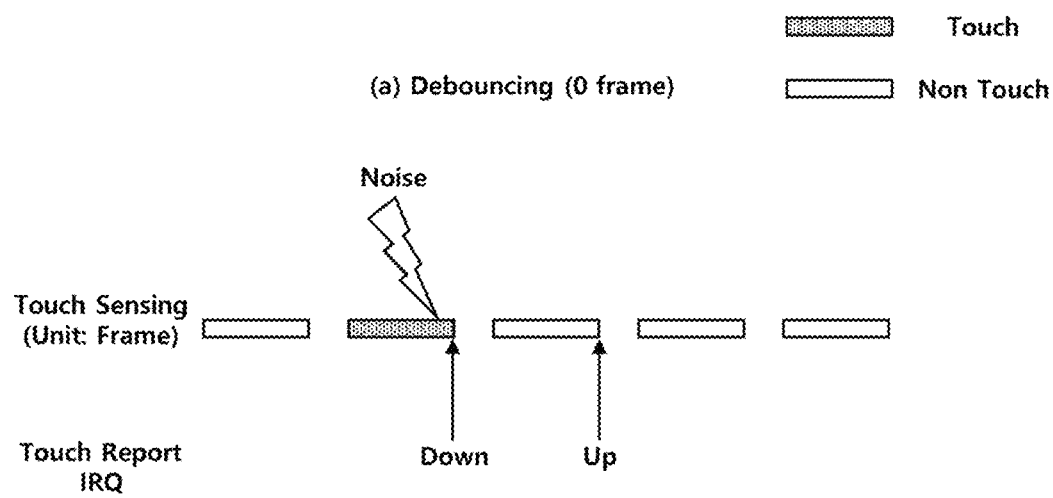
FIGS. 9A and 9B are diagrams for specifically describing an embodiment of a touch sensing operation when a bounce number threshold value is set and noise is inputted.
Figure 9B:
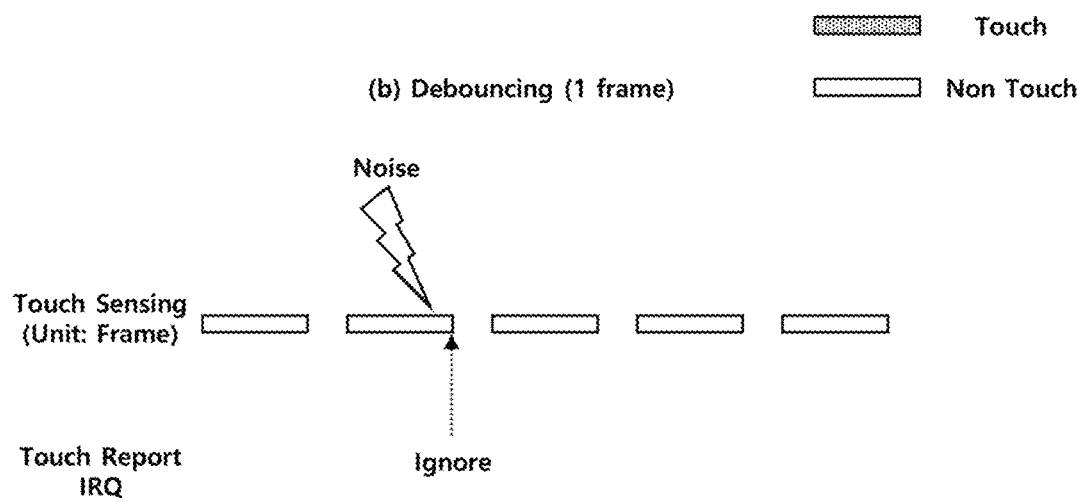

FIGS. 9A and 9B are diagrams for specifically describing an embodiment of a touch sensing operation when a bounce number threshold value is set and noise is inputted.

As shown in FIG. 9A, when noise corresponding to 1 frame in a case when the threshold value of the number of bounces is not set is generated, the noise may be recognized as an input touch and an IRQ including the relevant information is transmitted. This means that a touch that a user did not intend may be inputted and this may cause a malfunction of a device.

However, as shown in FIG. 9B, if the threshold value of the number of bounces is set as 1 frame, even when noise is inputted in 1 frame, the noise may not be considered to be recognized as an input touch. In this way, a touch that a user does not intend may be prevented from being inputted and a device prevented from malfunctioning.

Figure 10:
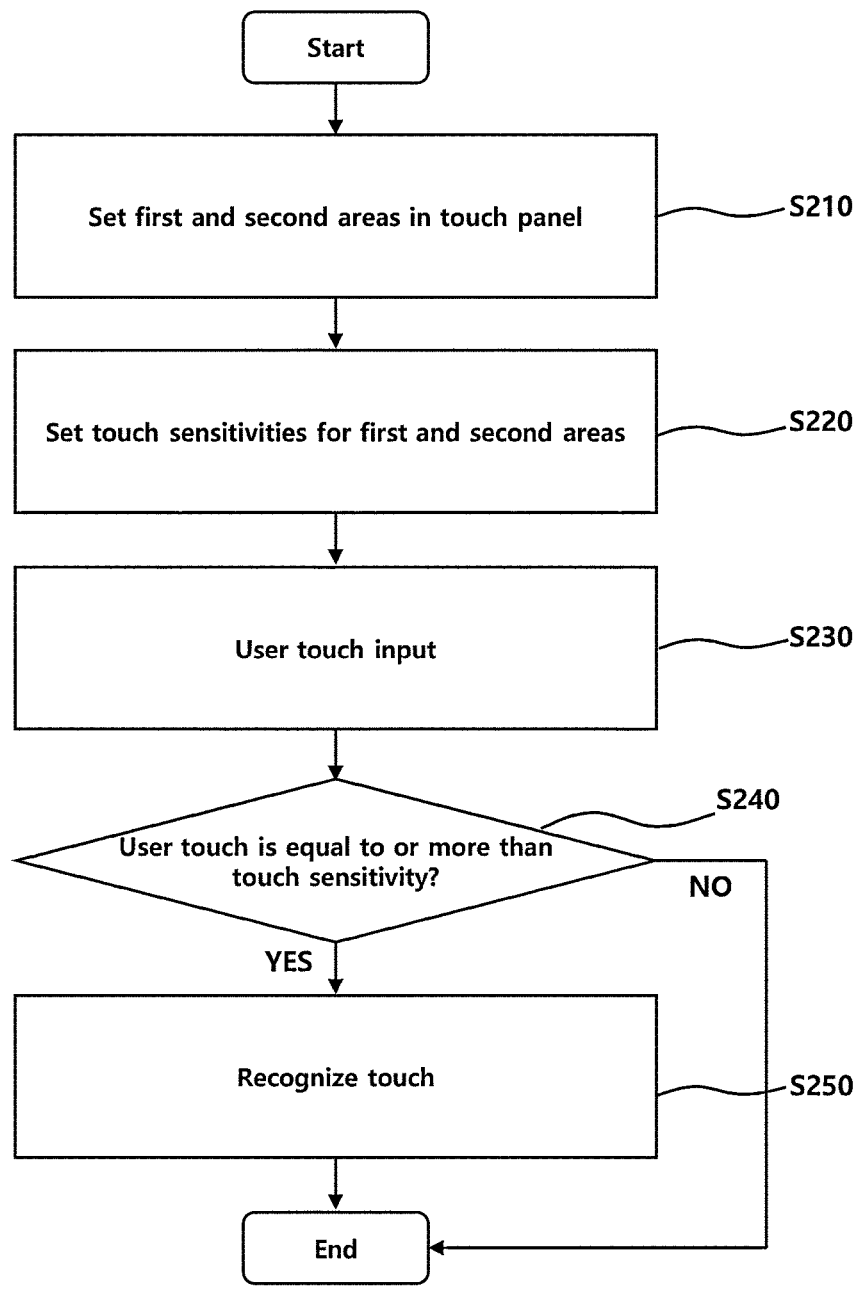
FIG. 10 is a flowchart for describing a touch performance management method in accordance with an embodiment.

FIG. 10 is a flowchart for describing a touch performance management method in accordance with an embodiment.

Referring to FIG. 10, the touch performance management method in accordance with the embodiment may start with step S210 of setting a first area 111_a and a second area 111_b on the touch panel 111. The first and second areas 111_a and 111_b set on the touch panel 111 may be set by the micro controller 142 installed in the touch driving device 140. The micro controller 142 may receive the area coordinate information from the host 160, and set the areas 111_a and 111_b. The first and second areas 111_a and 111_b set in the touch panel 111 may be distinguished by the display panel such that different applications are outputted to the respective areas, and the first and second areas 111_a and 111_b may correspond to areas displayed on the panel 110 by the display panel. The areas which may be set in the touch panel 111 are not limited to the first and second areas 111_a and 111_b, but two or more areas may be set.

When the first and second areas 111_a and 111_b are set in the touch panel 111, touch sensitivities may be set for the first and second areas 111_a and 111_b, respectively, in step S220. The touch sensitivities set for the first and second areas 111_a and 111_b, respectively, may be equal to or different from each other, and adjusted by setting the threshold value of change in capacitance of the touch panel 111, the threshold value of bounce number, information on whether filtering has been performed by the IIR filter, and the coefficient of the IIR filter. The touch sensitivities for the respective areas 111_a and 111_b of the touch panel 111 may be set by the micro controller 142 installed in the touch driving device 140. The micro controller 142 may receive, from the host 160, the information on the setting of the threshold value of change in capacitance, the threshold value of bounce number, the information on whether filtering has been performed by the IIR filter, and the coefficient of the IIR filter.

A user's touch may be inputted to the touch panel 111 in step S230. The user's touch may be conducted through a touch pen or a portion of the user's body including a finger, through which a current can flow.

The micro controller 142 may determine whether the sensitivity of the user's touch inputted to the first and second areas 111_a and 111_b is equal to or more than the touch sensitivity set in the touch panel 111, in step S240. Whether the sensitivity of the user's touch is equal to or more than the touch sensitivity may be determined on the basis of whether touch raw data or touch raw data filtered through the IIR filter is equal to or more than the threshold value of change in touch capacitance or equal to or more than the threshold value of the bounce number.

Among the user's touches inputted to the first and second areas 111_a and 111_b, only touches whose sensitivities are equal to or more than the touch sensitivity may be recognized in step S250. Here, a touch being recognized means that a touch is considered to be inputted. As only touches whose sensitivities are equal to or more than the touch sensitivity set in the touch panel 111 are recognized in step S250, a touch which is inputted when a user touches the touch panel 111 by mistake may not be recognized, which makes it possible to reduce an error caused by the user's mistake. Furthermore, when the user's touch is a continuous touch (drag) which is conducted through the second area 111_b from the first area 111_a, only a touch in the first area 111_a may be recognized. Furthermore, when the user's touch is a continuous touch (drag) which is conducted through the first area 111_a from the second area 111_b, only a touch in the second area 111_b may be recognized. Thus, when a continuous touch (drag) is inputted to another area, not a desired areas, due to the user's mistake, an unwanted operation may be prevented from being performed, which makes it possible to reduce an error.

Figure 11:
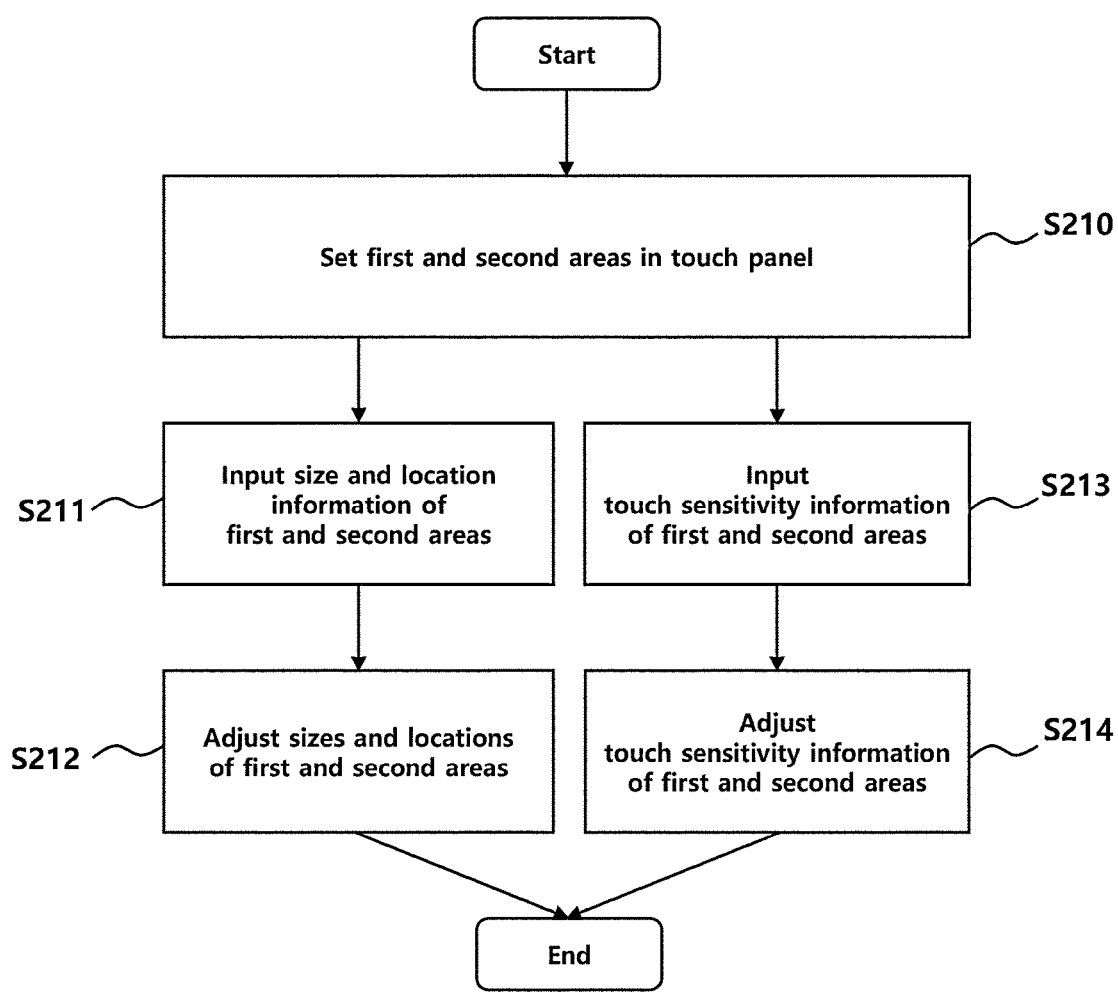
FIG. 11 is a flowchart for describing a process of adjusting the sizes, locations and touch sensitivities of a first area and a second area.

FIG. 11 is a flowchart for describing a process of adjusting the sizes, locations and touch sensitivities of first and second areas.

Referring to FIG. 11, the sizes and locations of the first and second areas 111_a and 111_b set in the touch panel 111 may be adjusted according to a user' selection, in step S212. Therefore, the user may manage the areas of the touch panel 111 as the user prefers. Furthermore, the areas which may be formed in the touch panel 111 in accordance with the present embodiment may not be limited to the first and second areas 111_a and 111_b, but one or more separate areas may be set in the touch panel 111. Thus, the user may also adjust the number of areas to be set in the touch panel 111 according to the user's selection.

Before step S212, step S211 of inputting the size and location information of the first and second areas may be performed. In order to adjust the sizes and locations of the first and second areas 111_a and 111_b set in the touch panel 111 or additionally set separate areas on the touch panel 111, the user may transmit area coordinate information to the micro controller 142 installed in the touch driving device 140 through the host 160. The area coordinate information may include information on the start x coordinate, the start y coordinate, the end x coordinate and the end y coordinate. The first and second areas 111_a and 111_b set in the touch panel 111 may be distinguished by the display panel such that different applications are outputted to the respective areas, and correspond to areas displayed on the panel 110 by the display panel. The one or more separate areas set on the touch panel 111 may be each a rectangular area having a diagonal line set to a line segment which connects a first point having the start x coordinate and the start y coordinate to a second point having the end x coordinate and the end y coordinate.

Referring to FIG. 11, the touch sensitivities of the first and second areas 111_a and 111_b set in the touch panel 111 may be adjusted in step S214. Thus, before step S214, step S213 in which the user inputs information for adjusting the touch sensitivities of the first and second areas 111_a and 111_b may be performed. The touch sensitivities of the first and second areas 111_a and 111_b may be adjusted by setting the threshold value of change in capacitance of the touch panel 111, the threshold value of a bounce number, information on whether filtering has been performed by the IIR filter, and the coefficient of the IIR filter. The user may transmit, through the host 160, the information on the setting of the threshold value of change in capacitance, the threshold value of the bounce number, the information on whether filtering has been performed by the IIR filter, and the coefficient of the IIR filter to the micro controller 142 installed in the touch driving device 140, thereby adjusting the touch sensitivities of the respective areas 111_a and 111_b.

Figure 12:
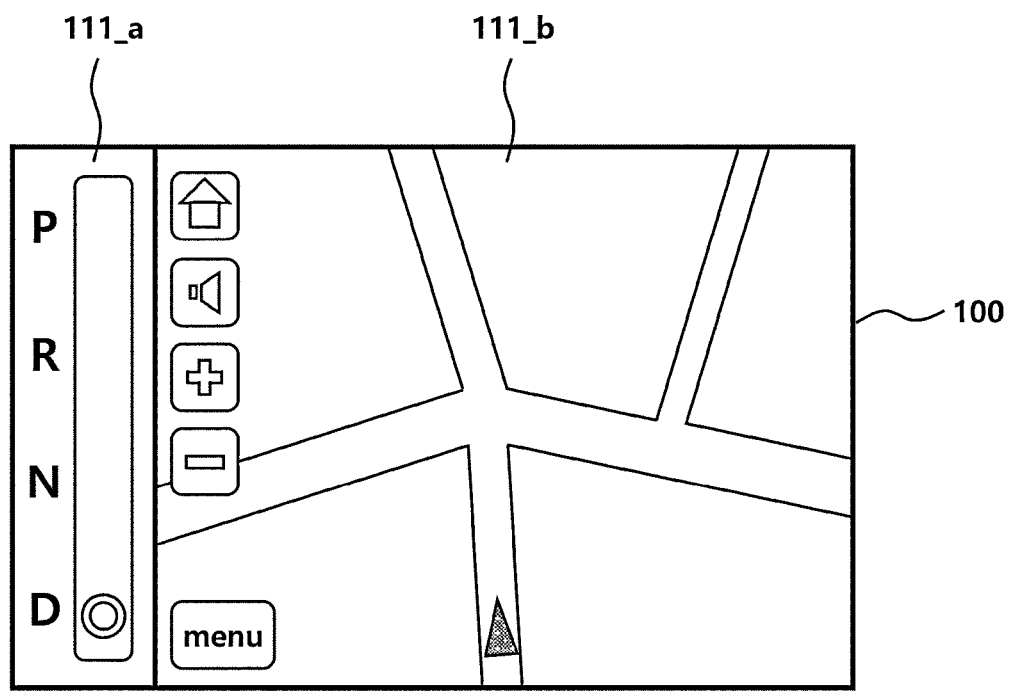
FIG. 12 is a diagram for describing a display device on which an application can be executed in accordance with an embodiment.

FIG. 12 is a diagram for describing a display device in which an application can be executed in accordance with an embodiment.

A display device 100 in accordance with an embodiment may include a display panel having a plurality of pixels P arranged therein, a touch panel 111 configured to receive a user's touch, a touch driving device 140 configured to set a first area 111_a and a second area 111_b in the touch panel 111 and set the touch sensitivities of the first and second areas 111_a and 111_b, and a display driving device configured to drive the display panel, and distinguish the first and second areas 111_a and 111_b such that different applications are outputted to the respective areas. The first and second areas 111_a and 111_b set in the touch panel 111 may be distinguished by the display panel such that different applications are outputted to the respective areas, and correspond to areas displayed on a panel 110 by the display panel.

The areas which may be formed in the touch panel 111 in accordance with the present embodiment are not limited to the first and second areas 111_a and 111_b, but one or more separate areas may be set in the touch panel 111, and the touch sensitivities of the respective separate areas may be differently set. A user may input area coordinate information to the host 160, and thus adjust the locations, sizes and number of areas which are to be set in the touch panel 111, according to the user's selection. The area coordinate information may include information on the start x coordinate, the start y coordinate, the end x coordinate and the end y coordinate.

The display panel may separately output applications, executed by the host 160, onto the respective first and second areas 111_a and 111_b. For example, the first and second areas 111_a and 111_b may be set on the touch panel 111 by the touch driving device 140, and the display panel may distinguish the first and second areas 111_a and 111_b such that different applications are outputted to the respective areas. The applications executed by the host 160 may be individually outputted onto the first and second areas 111_a and 111_b, respectively.

The touch sensitivities set in the first and second areas 111_a and 111_b, respectively, may be equal to or different from each other, and adjusted by setting the threshold value of change in capacitance of the touch panel 111, the threshold value of a bounce number, information on whether filtering has been performed by the IIR filter, and the coefficient of the IIR filter. The touch sensitivities for the respective areas 111_a and 111_b of the touch panel 111 may be set by the micro controller 142 installed in the touch driving device 140. The micro controller 142 may receive, from the host 160, the information on the setting of the threshold value of change in capacitance, the threshold value of bounce number, the information on whether filtering has been performed by the IIR filter, and the coefficient of the IIR filter.

An application for controlling the gear shift of a vehicle may be outputted onto one area of the first and second areas 111_a and 111_b, and a navigation application of the vehicle may be outputted onto the other area. The touch sensitivity of the area onto which the application for controlling the gear shift of the vehicle is outputted may be adjusted to a low level such that a touch by a user's mistake is not inputted.

The host 160 may be a main control circuit of an electronic device. For example, when the electronic device is a mobile communication terminal, the host may be an application processor of the mobile communication terminal. Furthermore, when the electronic device is a monitor or TV, the host may be a multi-core processor of the monitor or TV.

What is claimed is:

1. A touch driving device comprising:
    a touch driving circuit configured to supply a drive signal to a sensor electrode of a touch panel, receive a reaction signal of the sensor electrode to the drive signal, and generate a sensing value; and a micro controller configured to set a first touch sensitivity in a first area of the touch panel, to set a second touch sensitivity in a second area of the touch panel, and to determine whether a sensing value from the first area is equal to or more than the first touch sensitivity and if a sensing value from the second area is equal to or more than the second touch sensitivity, wherein the first area and the second area have different touch sensitivities, the micro controller is configured to adjust and determine sizes and locations of the first area and the second area based on area coordinate information received from a host, the area coordinate information includes a start x coordinate, a start y coordinate, an end x coordinate, and an end y coordinate of each area, and at least one of the first area and the second area include a rectangular area having a diagonal line connecting a first point corresponding to the start x coordinate and the start y coordinate and a second point corresponding to the end x coordinate and the end y coordinate.

2. The touch driving device of claim 1, wherein the micro controller is configured to generate a touch release event at a boundary between the first and second areas when the reaction signal is generated by a continuous touch passing from the first area to the second area.

3. The touch driving device of claim 1, wherein
each of one or more of the first touch sensitivity and the second touch sensitivity includes a threshold value of a change in capacitance of the sensor electrode, and
the micro controller is configured to determine that a touch is inputted when a change in capacitance equal to or greater than the threshold value is detected in the sensor electrode.

4. The touch driving device of claim 3, wherein the micro controller is configured to receive from the host different threshold values of changes in capacitance for the first and second areas.

5. The touch driving device of claim 1, wherein
a touch sensitivity includes a threshold value of the number of bounces, wherein a bounce means a phenomenon of repetition of touch inputs in an instant and,
the micro controller is configured to determine that a touch is inputted when a change in the number of bounces equal to or greater than the threshold value of the number of bounces is detected in the sensor electrode.

6. The touch driving device of claim 5, wherein the micro controller is configured to receive from the host different threshold values of the number of bounces for the first and second areas.

7. The touch driving device of claim 1, wherein the micro controller comprises an infinite impulse response (IIR) filter and is configured to determine whether there is a touch on the basis of a result value derived by calculating the sensing value by using the IIR filter.

8. The touch driving device of claim 7, wherein the micro controller is configured to receive from the host different filter coefficients of the IIR filter for the first and second areas.

9. A touch driving device comprising:
an area setting circuit configured to set a first area and a second area on a touch panel;
a touch sensitivity setting circuit configured to set a first touch sensitivity for the first area and to set a second touch sensitivity for the second area; and
a touch recognition circuit configured to determine whether a first touch inputted in the first area is equal to or more than the first touch sensitivity and/or if a second touch inputted in the second area is equal to or more than the second touch sensitivity, wherein
the area setting circuit is configured to adjust and determine sizes and locations of the first area and the second area based on area coordinate information received from a host,
the area coordinate information includes a start x coordinate, a start y coordinate, an end x coordinate and an end y coordinate of each area, and
at least one of the first area and the second area include a rectangular area having a diagonal line connecting a first point corresponding to the start x coordinate and the start y coordinate and a second point corresponding to the end x coordinate and the end y coordinate.

10. The touch driving device of claim 9, wherein the touch recognition circuit is configured to determine only a touch in the first area to be inputted when a user's touch is a continuous touch passing from the first area to the second area.

11. The touch driving device of claim 9, wherein the area coordinate information received from the host is adjusted according to a user's selection.

12. The touch driving device of claim 9, wherein the touch sensitivity setting circuit is configured to change the touch sensitivities of the first and second areas according to a user's selection.

13. A display device comprising:
a touch panel configured to receive a user's touch;
a touch driving device configured to set a first area and a second area in the touch panel, to set a first touch sensitivity for the first area, and to set a second touch sensitivity for the second area, the second touch sensitivity being different from the first touch sensitivity; and
a display panel configured to display different applications in areas respectively corresponding to the first and second areas, wherein
the touch driving device is configured to adjust and determine sizes and locations of the first area and the second area based on area coordinate information received from a host,
the area coordinate information includes a start x coordinate, a start y coordinate, an end x coordinate and an end y coordinate of each area, and
at least one of the first area and the second area include a rectangular area having a diagonal line connecting a first point corresponding to the start x coordinate and the start y coordinate and a second point corresponding to the end x coordinate and the end y coordinate.

14. The display device of claim 13, wherein the display panel is configured to separately display applications executed by a host, in the areas respectively corresponding to the first and second areas.

15. The display device of claim 14, wherein an application for controlling a gear shift of a vehicle is displayed in an area corresponding to the first area and a navigation application is displayed in an area corresponding to the second area.

* * * * *